US012182383B2

(12) United States Patent
Yue

(10) Patent No.: US 12,182,383 B2
(45) Date of Patent: *Dec. 31, 2024

(54) COLLABORATION USER INTERFACE FOR COMPUTING DEVICE

(71) Applicant: Brain Technologies, Inc., San Mateo, CA (US)

(72) Inventor: Sheng Yue, San Mateo, CA (US)

(73) Assignee: Brain Technologies, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,141

(22) Filed: Apr. 24, 2023

(65) Prior Publication Data
US 2024/0045576 A1 Feb. 8, 2024

Related U.S. Application Data

(63) Continuation of application No. 17/194,036, filed on Mar. 5, 2021, now Pat. No. 11,662,888.
(Continued)

(51) Int. Cl.
*G06F 40/35* (2020.01)
*G06F 3/0484* (2022.01)
(Continued)

(52) U.S. Cl.
CPC ............ *G06F 3/0484* (2013.01); *G06F 40/14* (2020.01); *G06F 40/35* (2020.01); *H04L 67/535* (2022.05)

(58) Field of Classification Search
None
See application file for complete search history.

(56) References Cited

U.S. PATENT DOCUMENTS 9,633,317 B2 4/2017 Gabel et al.
10,210,244 B1 2/2019 Branavan et al.
(Continued)

FOREIGN PATENT DOCUMENTS

WO WO 2019/203869 A1 10/2019

OTHER PUBLICATIONS

Microsoft News, "Microsoft Patents Dynamic User Interface That Changes According To A Type Of Input," Dec. 4, 2014, two pages, [Online] [Retrieved on May 5, 2021] Retrieved from the Internet <URL: https://mspoweruser.com/microsoft-patents-dynamic-user-interface-that-changes-according-to-a-type-ofinpuU>.
(Continued)

*Primary Examiner* — Ariel Mercado-Vargas
(74) *Attorney, Agent, or Firm* — Fenwick & West LLP

(57) ABSTRACT

A collaboration system provides a collaboration interface for display to interacting users. The collaboration system analyzes messages among a group of users to determine an intent of the group to collaborate. When an intent is assigned to a set of messages, the collaboration system generates collaboration interfaces to prompt each of the users to select their preferred values for attributes of the collaboration, such as a meeting location, time, and date. The user selections are recorded in a collaboration data object which is monitored for matching selections. When multiple users have selection the same values for attributes of the collaboration the collaboration data object is locked from further changes and the collaboration system executes tasks to resolve the intent such as booking tickets, making reservations, and providing confirmation messages to the collaborating users.

20 Claims, 10 Drawing Sheets

Related U.S. Application Data

(60) Provisional application No. 62/985,784, filed on Mar. 5, 2020.

(51) Int. Cl.
    *G06F 40/14*     (2020.01)
    *H04L 67/50*     (2022.01)

(56) References Cited

U.S. PATENT DOCUMENTS

| | | | |
|---|---|---|---|
| 11,301,777 B1 | 4/2022 | Talmor | |
| 11,747,965 B2 * | 9/2023 | D'Amore | G06Q 10/101 715/753 |
| 2010/0162131 A1 | 6/2010 | Gaillard et al. | |
| 2011/0179176 A1 * | 7/2011 | Ravichandran | H04L 9/40 709/226 |
| 2013/0173650 A1 | 7/2013 | Marantz et al. | |
| 2013/0226953 A1 | 8/2013 | Markovich et al. | |
| 2013/0244614 A1 | 9/2013 | Santamaria et al. | |
| 2013/0262598 A1 * | 10/2013 | Makanawala | G06Q 50/01 709/206 |
| 2013/0346134 A1 * | 12/2013 | Klug | G06Q 10/06 705/7.15 |
| 2015/0200976 A1 | 7/2015 | Goldfeder et al. | |
| 2015/0346937 A1 * | 12/2015 | Mahmoudian-Bidgoly | G06F 16/954 715/753 |
| 2016/0170594 A1 | 6/2016 | Rosenberg | |
| 2016/0292172 A1 | 10/2016 | Song et al. | |
| 2016/0342665 A1 * | 11/2016 | Lane | G06F 3/0484 |
| 2017/0134350 A1 * | 5/2017 | Kravitz | H04L 63/0435 |
| 2019/0147092 A1 | 5/2019 | Pal et al. | |
| 2019/0340574 A1 * | 11/2019 | Ekambaram | G06F 9/453 |
| 2021/0157817 A1 | 5/2021 | Allen et al. | |

OTHER PUBLICATIONS

PCT International Search Report and Written Opinion, PCT Application No. PCT/US21/21216, May 20, 2021, 17 pages.

United States Office Action, U.S. Appl. No. 17/194,036, filed Dec. 8, 2021, 24 pages.

United States Office Action, U.S. Appl. No. 17/194,036, filed Apr. 4, 2022, 26 pages.

United States Office Action, U.S. Appl. No. 17/194,036, filed Aug. 29, 2022, 25 pages.

* cited by examiner

COLLABORATION USER INTERFACE FOR COMPUTING DEVICE

CROSS-REFERENCE TO RELATED APPLICATIONS

This application is a continuation of U.S. patent application Ser. No. 17/194,036, filed Mar. 5, 2021, now U.S. Pat. No. 11,662,888, which claims the benefit of U.S. Provisional Patent Application 62/985,784 filed Mar. 5, 2020, which are incorporated herein by reference in their entirety.

FIELD OF ART

This disclosure relates generally to facilitation of user collaboration and more particularly to facilitating a decision-making process among collaborating users to execute a shared user intent.

BACKGROUND

Group decision making can be complicated, especially as membership in a group of collaborators increases. Even between two people event coordination can take some time due to various factors such as indecisiveness, conflicting schedules, and differences of opinion. The problems exist, and often compound, when collaboration is attempted over online electronic communication mediums. For example, these issues can become apparent to users participating in a group chat, email chain with many recipients, video conference, phone call, or other system of communication in which many messages may need to be sent among all the participants before a meeting time, location, and agenda is determined. As one example, after deciding to get dinner together, members of a group chat may still need to decide on a cuisine, restaurant location, and time and day of meeting to plan the event. This kind of conversation can often take the form of a long chain of messages that can be confusing to read, especially in the cases of group chats with many members.

The confusion and unwieldiness in group electronic communication mediums may be from, for example, cross communications where decisions or information cross causing more back and forth communication. In other examples of shortcomings there may be an inability to get consensus due to information not known to other users, e.g., travel time or distance to a selected location or specific user restrictions relative to what the users are trying to coordinate around (e.g., dietary restrictions for a restaurant meetup or age restrictions around an age restricted event). A system that facilitates the decision making process would be beneficial.

DETAILED DESCRIPTION

Figure 1:
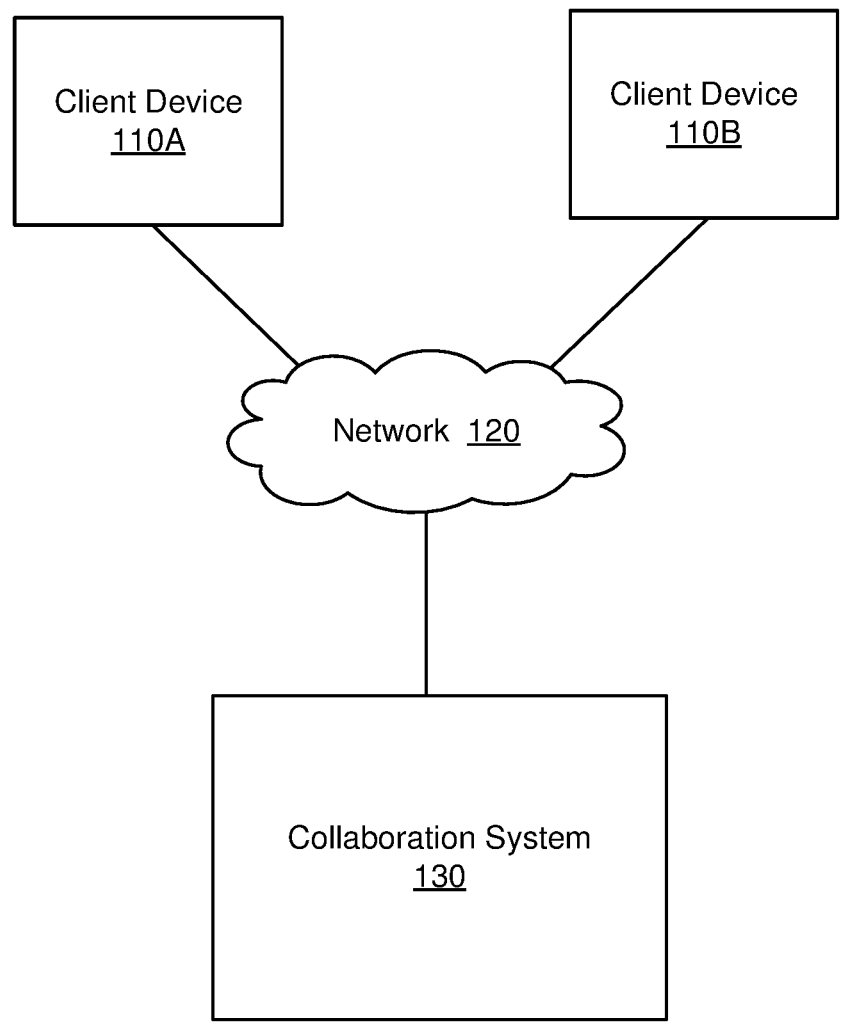
FIG. 1 is a high level block diagram of a system environment for a collaboration system, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the disclosed configurations for purposes of illustration only. One skilled in the art will readily recognize from the following description that alternative embodiments of the structures and methods illustrated herein may be employed without departing from the principles described herein.

Disclosed is a system (as well as a method and a computer program product comprising program code (or executable instructions) stored on non-transitory computer readable storage medium) to facilitate participation and collaboration between users on an electronic communication medium. By way of example, to facilitate user participation and collaboration, a collaboration system provides information for client devices to display collaboration interfaces to interacting users. In various embodiments, the collaboration system may generate different collaboration interfaces based on the type of decision the group of interacting users is trying to make or the type of event the group of interacting users may be planning. In one embodiment, the collaboration system may use a natural language processing (NLP) system to predict an intent of the group of users based on an analysis of one or more messages sent among the users via a messaging application. In some example embodiments, in the absence of an intent corresponding to predefined tasks, the collaboration system may also be initiated when the NLP system to detects an invitation from one party and interest or confirmation from another party. Messaging applications may include applications that support communication between multiple users, such as text messages, emails, phone calls, and video chats.

An intent is a goal of one or more of the users that can be accomplished by executing a set of tasks. Thus, an intent of a group of users using the collaboration system may be a group goal of collaborating to plan a particular type of event or working together to make a particular decision and each intent is associated with a set of tasks that need to be completed to achieve the goal. That is, a predicted intent is associated with a set of tasks that can be executed to resolve the intent. For example, based on analysis of messages among a group of users on a group chat, the NLP system may predict that an intent of the users is to meet up for dinner. The set of tasks associated with an intent vary based on the intent. For example, an intent of planning a group dinner may include the task of reserving a table at a restaurant. Thus, the intent is resolved when the task has been executed, that is, when a table has been reserved at the restaurant. As another example, an intent of scheduling a meeting may be resolved with execution of the tasks of scheduling a video conference and sending the invitations to join the video conference to meeting attendees. In one embodiment, the collaboration system may assign an intent to communications between users by analyzing the particular communication for context and other details as is further disclosed herein. In various embodiments, the collaboration system may store a set of possible intents that can be assigned to an instance of user collaboration, e.g., based on a prediction. The collaboration system may also store the tasks associated with each possible intent. In some embodiments, the collaboration system may be configured to generate new intents (i.e., to develop new sets of tasks). In particular, the NLP system may detect a set of tasks that often go together or a subset of tasks of an existing intent and dynamically associate stored tasks of an existing intent to a new intent. This can enable flexibility of the collaboration system to respond to new intents and goals of groups of collaborating users.

A task may have a set of attributes (e.g., input parameters) that are provided as inputs to execute the task. Attributes may also be referred to as "entities" or "actionable variables." To prepare a task associated with an assigned intent for execution, the collaboration system collects an input value for each attribute of the task. For example, the task of reserving a table at a restaurant may take in input parameters including a time, a date, a restaurant, and a number of people for the reservation. In some cases, rather than prompting an external application, a task may include collecting values associated with a set of attributes. For example, if a predicted user intent is to meet up at a local park where no bookings or reservations are required, a task associated with the intent may be to determine a park and a time for the meeting. In this example case, execution of the task may comprise informing the participating users of the determined park and time, for example in a confirmation message.

To facilitate collaboration, the collaboration system determines the appropriate values for each attribute of a task by providing client devices with information for displaying collaboration interfaces to users. In one embodiment, the collaboration system may store various collaboration interface templates that can be used to collect attributes for resolving different intents. After predicting an intent of a group of users, the collaboration system provides information for a client device to display a collaboration interface associated with the predicted intent to each of the client devices of the collaborating users. The collaboration interface may prompt the users to select values for each of the attributes that are needed to execute tasks associated with the intent. The collaboration system also may generate a collaboration data object, which may be a document, file, or other means of data storage. The collaboration data object tracks the value that each collaborating user selects for each of the attributes. In some embodiments, the collaboration interface may provide for display (e.g., program code to enable rendering on a screen associated with a computing device) information about other collaborating users. That is, the collaboration interface may provide for display information about a value another user has selected for an attribute and the collaboration interface may display maps with information about how long it might take each of the collaborating users to arrive at a selected location for an event.

When the collaborating users have all selected the same value for each of the attributes, the collaboration system may lock the collaboration data object so that the users can no longer change their selected values. The values stored in the locked data object are used to execute the tasks to resolve the assigned intent, for example, by prompting a third party application to execute a task of reserving a table at a selected restaurant. In this way, the collaboration system prompts participating users to select and alter their own individual preferences as input values for an intent until the group of users comes to an agreement.

Example Collaboration System Environment

FIG. 1 is a high level block diagram of a system environment for a collaboration system, in accordance with an example embodiment. FIG. 1 includes two or more client devices 110, a collaboration system 130, and a network 120. The network 120 communicatively connects the client devices 110 with each other and the collaboration system 110. For clarity, only two client devices, client device 110A and client device 110B, are shown in FIG. 1. Alternate embodiments of the system environment can have any number of client devices 110 as well as multiple collaboration systems 130.

The functions performed by the various entities of FIG. 1 may vary in different embodiments. The collaboration system 130 is configured to assign an intent to a set of communications (e.g., messages) between users, present the group of users with an option to collaborate to resolve the assigned intent, and provide information to client devices of the users to display a collaboration interface (e.g., provide for display on a screen on a client device) to guide the users through selecting attribute values associated with resolution of the intent. When the users have agreed on a set of values for attributes of tasks that must be executed to resolve the intent, the collaboration system 130 may execute the tasks locally, or may instruct a third party application or system to execute one or more of the tasks.

A user may enter user input such as typed text or spoken voice inputs via a client device 110. Client devices 110 can be any personal or mobile computing devices such as smartphones, tablets, notebook computers, laptops, desktop computers, and smartwatches, as well as any home entertainment device such as televisions, video game consoles, television boxes, and receivers. In some embodiments, a client device, e.g., 110A, supports at least one messaging application through which a user may communicate with another user at another client device 110, e.g., 110B. Messaging applications may include applications that support communication between multiple users, for example applications that support text messages, emails, phone calls, and video chats. In some embodiments, the client devices 110 include local applications associated with the collaboration system 130 that provide the collaboration system 130 with access and permissions to analyze communications between users on a messaging application. The local applications associated with the collaboration system 130 also may allow the collaboration system 130 to provide information to client devices 110 to display collaboration interfaces and feedback to users from within the messaging applications. For example, a user may be prompted to begin collaboration with other users from within a text messaging application running on the user's client device 110.

As noted, a client device, e.g., 110 can communicate with other client devices, e.g., 110B, and with the collaboration system 130 via the network 120. The network may be any combination of local area and wide area networks employing wired or wireless communication links. In some embodiments, all or some of the communication within the network 120 may be encrypted.

Figure 2:
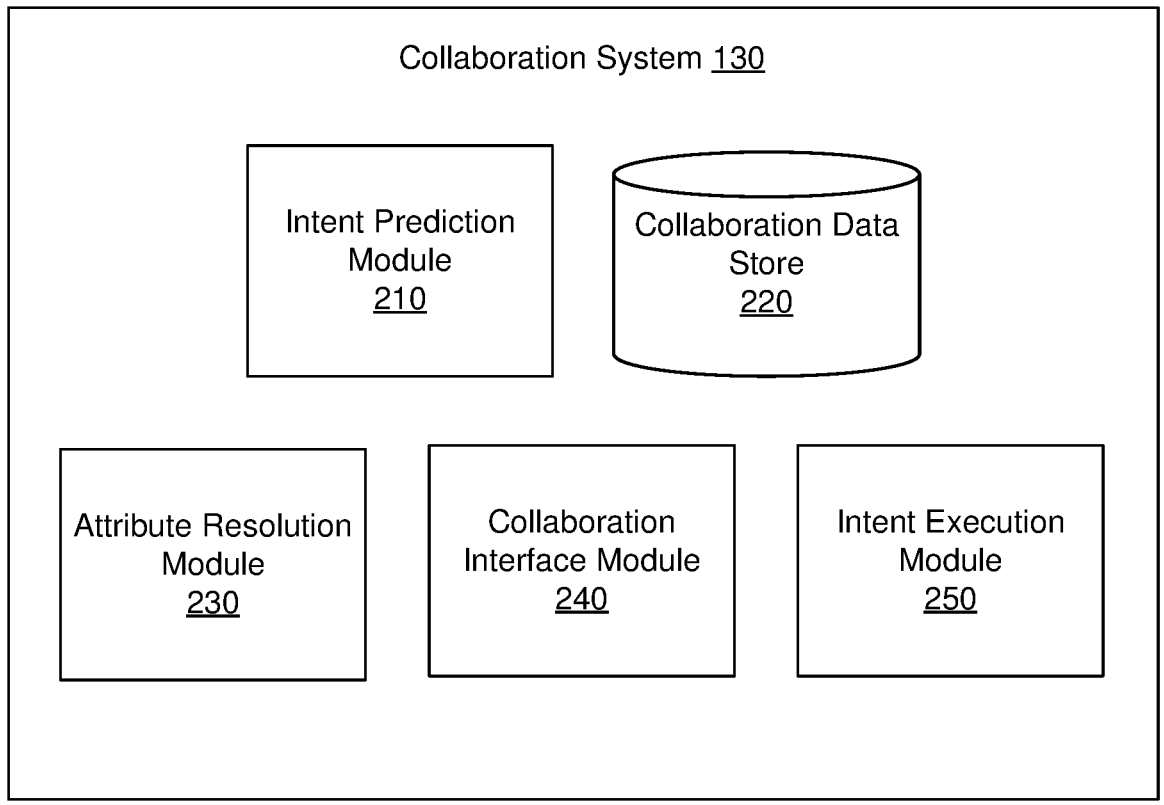
FIG. 2 is a high-level block diagram of a system architecture for the collaboration system, in accordance with an example embodiment.

FIG. 2 is a high-level block diagram of a system architecture for the collaboration system 130, in accordance with an example embodiment. The collaboration system 130 may include various modules and data stores for supporting user collaboration. The collaboration system 130 may include an intent prediction module 210, a collaboration data store 220, an attribute resolution module 230, a collaboration interface module 240, and an intent execution module 250. The collaboration system 130 may include services and other functions that are not shown herein. Likewise, computer components such as web servers, network interfaces, security functions, load balancers, failover services, management and network operations consoles, and the like are not shown so as to not obscure the details of the system architecture. Additionally, the collaboration system 130 may contain more, fewer, or different components than those shown in FIG. 2 and the functionality of the components as described herein may be distributed differently from the description herein.

The intent prediction module 210 identifies and assigns one or more intents to a group (e.g., two or more) of users based on a set of one or more messages sent among the users in a messaging application. In some embodiments, the intent prediction module 210 includes a natural language processing (NLP) system or other computer model that is trained to analyze a set of messages among a group of users and to output a prediction of an intent of the group of users based on the content of the messages. In the absence of a specific or expected intent, the intent prediction module may also recognize invitations and subsequent confirmations from groups of users, and use this signal to assign a generic collaboration intent. In various embodiments, the NLP system or other computer model may accept input information in addition to the message contents. Additional inputs that the intent prediction module 210 may use to determine an intent may include profile, schedule, and location information about each of the interacting users, user history about each of the interacting users, past intents of the group of users, and contextual information such as data about current events, time of day, and weather forecasts. In some embodiments, such additional inputs may allow for pre-planning periodically occurring collaborations. For example, if a pair of users had planned collaborations for dinner every Thursday for the past few weeks, the same future collaboration may be pre-populated and resolved in advance after confirmation from the users.

An NLP system or other computer model may be trained using training data sets comprising labeled input sets and using other natural language processing training techniques. Training data may include past conversations between users that have been labeled with one or more applicable intents. A training conversation may include one or more messages back and forth among users in a group. Examples of possible intent labels include food collaboration, movie collaboration, and flight collaboration. In addition to the applicable intents, the messages within the training conversations may be labeled with metadata indicating "start of conversation," "end of conversation," "collaboration confirmation" (indicating an agreement or confirmation in the conversation), and "no label" (indicating an ongoing conversation). The messages may also be labeled with attributes information identifying the presence of attribute values. Example attribute labels may include "PERSON," "TIMEPOINT," "LOCATION", "CUISINE," "DISH," and "EVENT". In some embodiments, the intent prediction module 210 may receive an intent prediction from an outside source or the users may select and send a chosen intent for collaboration to the collaboration system 130.

In various embodiments, the intent prediction module 210 may use rule-based or model-based approaches to identify intents based on the input messages to group conversations. In some embodiments, both semantic similarity models and direct intent classification models are used by the intent prediction module 210 to predict intents based on the input messages. To train the semantic similarity models, sets of messages are identified as being applicable to each of a set of possible intents. One or more neural networks may be trained to recognize messages that are similar to the identified sets of messages and to classify the messages as being associated with the applicable intent or intents. Direct classification models may involve using the messages as input and training the model to output one or more of a fixed set of classes that either correspond to a known intent or that indicate that the intent is unknown. Depending on the embodiment, the intent prediction models of the intent prediction module 210 may have various architectures. The models may be compact machine learning models such as logistic regression models, support vector machines, and gradient boosted decision trees. In some embodiments, the models could also be trained neural networks or encoders. Different model architectures may also be combined and/or trained together in some cases.

In some embodiments, the models of the intent prediction module 210 may accept message history as input in addition to new and/or incoming messages. That is, the intent prediction module 210 can be trained to predict intents based on more recent messages in a conversation or based on recent messages read in context of the longer conversation. This allows the intent prediction module 210 to generate predicted intents that are more customized to the particular users in the conversation. For example, if a past set of messages among the group of users in the previous few days included a user expressing interest in exploring downtown Seattle, the intent prediction module 210 can predict that an intent when the users are later discussing dinner plans is not only to meet up for dinner, but to meet up in downtown Seattle for dinner.

The collaboration data store 220 stores data related to user collaboration including collaboration data objects, collaboration interface templates, and information about tasks associated with possible intents. In one embodiment, the collaboration data store 220 stores a set of possible intents that can be assigned to a set of messages by the intent prediction module 210. The collaboration data store 220 also stores a set of tasks that may be associated with each possible intent as well as a list of attributes that are used as inputs for executing each task. The collaboration data store 220 may keep track of mappings from each possible intent to its associated tasks, and may also keep track of the attributes required from the users to resolve those tasks. The collaboration data store may also store collaboration interface templates that the collaboration system 130 can use to provide an interface to a client device 110 of each of a set of collaborating users to prompt the users to select preferred values for each of the attributes that are needed to resolve the intent. For example, the collaboration data store 220 may store an interface template for each of the possible intents that the intent prediction module 210 may assign to a set of messages. Additionally, in some cases, the stored interface templates also may be used for unforeseen or new intents if the NLP system determines a new potential intent based on analysis of sets of tasks that are requested by users that are similar to an existing intent, in which case the interface template for the existing intent may be applicable for gathering attribute data for the new intent. For example, the collaboration data store 220 may store an interface template associated with an intent for booking flights between friends, and a user may express a new intent of flying in a private airline, in which case the same interface template that is used for booking commercial airlines may be applied to collect data for needed for collaborating to book a private flight. Additionally, the collaboration data store 220 may store collaboration data objects. A collaboration data object may be a document, file, or other means of data storage. A collaboration data object may be used by the collaboration system 130 to keep track of values that multiple collaborating users have selected to assign to attributes of an intent during the collaboration process.

The attribute resolution module 230 manages attribute value selections made by collaborating users. The attribute resolution module 230 determines which attributes are associated with an assigned intent, for example, by accessing information about tasks associated with the intent stored in the collaboration data store 220. When a set of users request a collaboration interface via client devices 110, for example in response to a prompt from the collaboration system 130 that an intent has been detected from their messages, the attribute resolution module 230 generates a collaboration data object to keep track of the collaboration. In one embodiment, a collaboration data object may be a data structure that stores identification of each collaborating user, information about what possible values the user has selected to assign to each attribute of the tasks that are relevant to resolving the intent, and information about whether the users have reached an agreement on the attribute values. As users select attribute values, the attribute resolution module 230 updates the data about the user selections stored in the collaboration data object. The attribute resolution module 230 may use trained machine learning models to identify attribute values in the messages included in an input conversation from users. The models may be trained using similar training data to the labeled training data used for the models of the intent prediction module 210. The models may have various architectures in different embodiments, including compact machine learning models such as logistic regression models, support vector machines, and gradient boosted decision trees. In some embodiments, the models could also be trained neural networks or encoders. Different model architectures may also be combined and/or trained together in some cases. In some embodiments, the intent prediction module 210 may be trained to identify and/or predict attribute values based on the messages received from the users in a group, in addition or in place of the attribute resolution module 230.

When all of the collaborating users have selected the same values for each of the attributes in the collaboration data object, the attribute resolution modules 230 may lock the collaboration data object so that no further changes can be made. The matching selections among all of the user selections may be used by the collaboration system 130 to resolve the intent. In various embodiments, the attribute resolution module 230 may lock the collaboration data object when different conditions are met, such as when a majority or other predefined amount of the collaborating users have reached an agreement on the attribute values.

The collaboration interface module 240 provides for generating collaboration interfaces. The collaboration interfaces may be transmitted to the client devices 110 to have a client device 110 provide the interfaces for display on a screen (e.g., rendered to display) for a user. In one embodiment, the collaboration interface module 240 may generate a collaboration interface using a collaboration interface template stored in the collaboration data store 220. A collaboration interface allows a user to view and select options for each attribute value. When a value selection is made, the collaboration interface module 240 may pass the information to the attribute resolution module 230 to update the collaboration data object with the new value selection. In some embodiments, the collaboration interface module 240 may update collaboration interfaces based on value selections other users have made. For example, the collaboration interface module 240 may access the relevant collaboration data object stored in the collaboration data store 220 and update a user interface as displayed at the client device 110 of the user to show a user information about which values other users have selected for an attribute. In some embodiments, the collaboration interface module 240 may include contextual information in the collaboration interface shown to a user to help the user in making decisions about the attribute values. For example, a collaboration interface may include a map that displays an estimated time it will take for each of the collaborating users to reach a destination, e.g. a restaurant, from their current locations.

The intent execution module 250 manages execution of tasks associated with an intent. In some cases, the intent execution module 250 may be able to execute a task locally. For example, if a task includes presenting a set of agreed upon attribute values to the collaborating users, the intent execution module 250 can collect the attribute values from the locked collaboration data object stored at the collaboration data store 220 and can generate a message to the users listing the selected value for each attribute. In some cases, the intent execution module 250 provides selected attributes from the collaboration data object to a third party system or application as inputs so that the third party application or system can execute the task. For example, the intent execution module 250 may provide a selected restaurant, time, and number of diners to a third party application that can reserve a table at the restaurant. In some cases the intent execution module 250 may provide an option to one or more of the group of collaborating users to confirm the execution of a task, for example, a user may be prompted to complete a purchase or booking process manually and provided a link to do so. When tasks associated with the assigned intent are executed, the intent execution module 250 may generate a confirmation message for one or more of the group of collaborating users describing the results of the collaboration.

Figure 3:
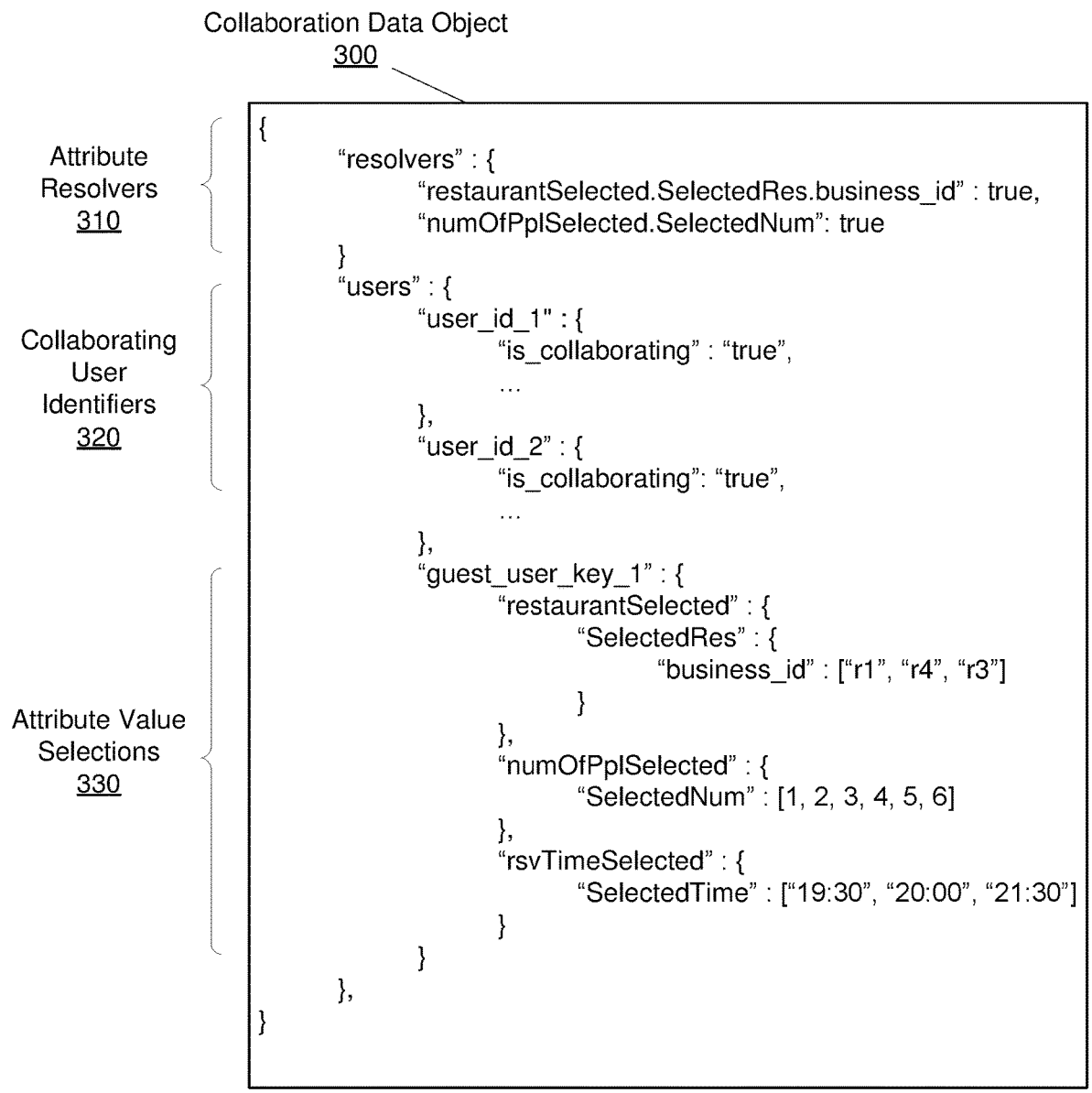
FIG. 3 illustrates portions of an example collaboration data object 300, in accordance with an embodiment.

FIG. 3 illustrates portions of an example collaboration data object 300, in accordance with an embodiment. A collaboration data object 300 may store collaboration data in any data format. The example of FIG. 3 is formatted as a JavaScript Object Notation shareable key data structure. The example collaboration data object includes attribute resolvers 310, collaborating users identifiers 320, and attribute value selections 330. The attribute resolvers 310 are a set of attributes associated with the intent that need to be agreed upon by the collaborating users to resolve the intent. In one embodiment, an attribute resolver 310 may be set to a value of "true" once all users have selected the same value for that attribute. In some cases, the attribute resolution module 230 may lock the collaboration data object 300 once all of the attribute resolvers 310 are set to "true." The collaborating user identifiers 320 identify each of the collaborating users and may store information about which of the users participating in the group message opted to participate in the collaboration process. The collaboration data object 300 also includes attribute value selections 330 for each of the collaborating users. The example of FIG. 3 shows example value selections made by a first user (user_id_1). In some embodiments, a user may select multiple possible values for each of the attributes. For example, the user shown in the example of FIG. 3 has selected restaurants r1, r4, and 43, selected a group size of 1, 2, 3, 4, 5, or 6 diners, and has selected possible reservation times of 19:30, 20:00 and 21:30.

FIGS. 4A-H illustrate an example exchange and collaboration between two example users, each on a respective client device, e.g., 110A, 110B. By way of example, a first user "Wyatt Watson" on a first client device 110A, is communicating with a second user "Jim Jones" on a second client device 110B. Example users Wyatt and Jim discuss going together to see a movie. The collaboration system 130, through the intent prediction module 210, assigns an intent of booking movie tickets to the set of messages between the users based upon an analysis of their communication as corresponding to going to a movie. The collaboration system 130, through the collaboration interface module 240, provides them with prompts to collaborate to plan their outing.

Figure 4A:
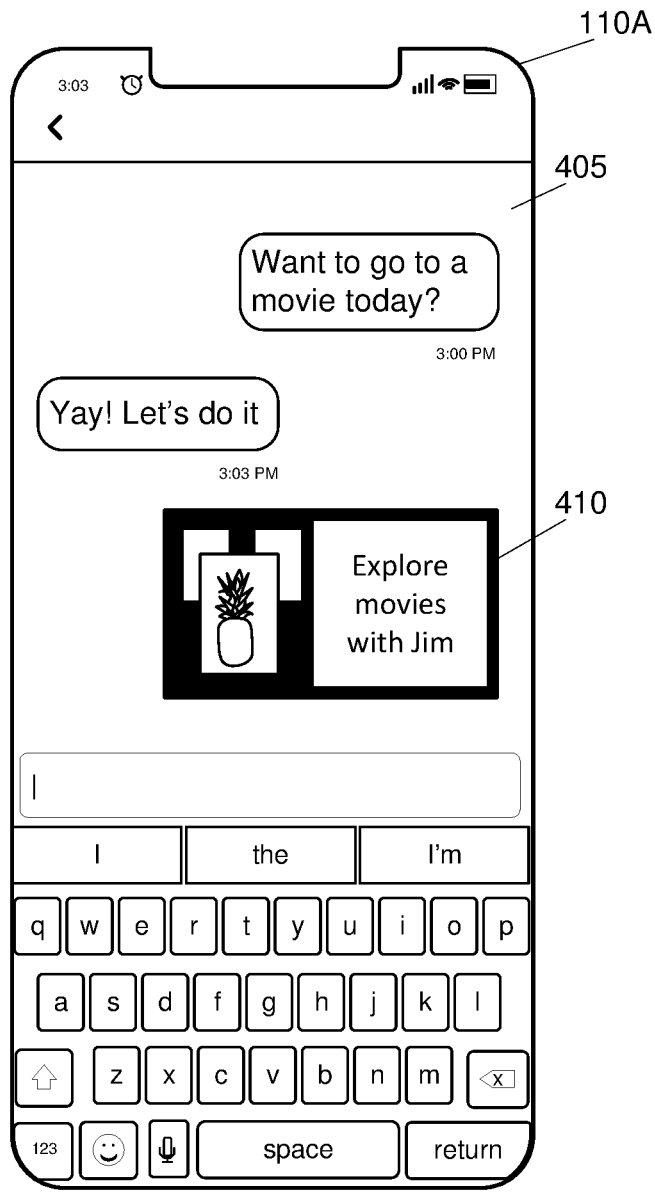
FIG. 4A illustrates a prompt to collaborate with other users displayed in a messaging application on a client device of a first user, in accordance with an example embodiment.

FIG. 4A illustrates a prompt to collaborate with other users displayed in a messaging application on a client device 110A of a first user, in accordance with an example embodiment. Example first user Wyatt is communicating through a messaging application 405 on his client device 110A with his friend Jim Jones. Wyatt asks Jim if he wants to see a movie and Jim agrees. The collaboration system 130 assigns, via the intent prediction module 210, an intent of going to see a movie to the set of messages between Wyatt and Jim and consequently provides each of the users with a collaboration prompt 410 that gives them the option to choose to collaborate on selecting a movie to see.

Figure 4C:
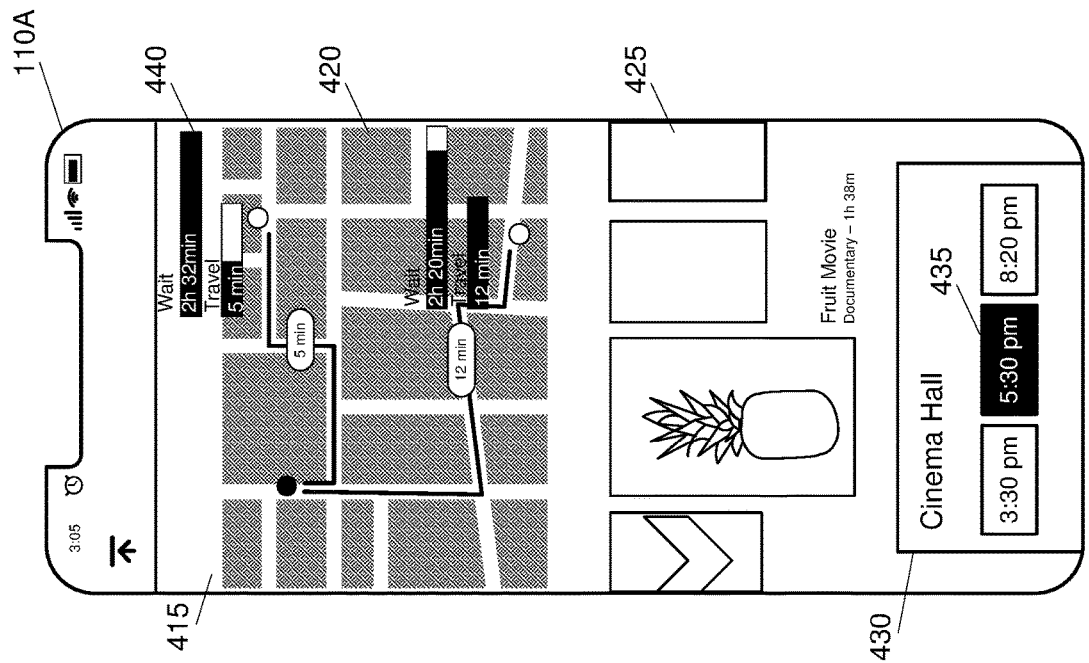
FIG. 4C further illustrates the collaboration interface displayed on the client device of the first user, in accordance with an example embodiment.
Figure 4B:
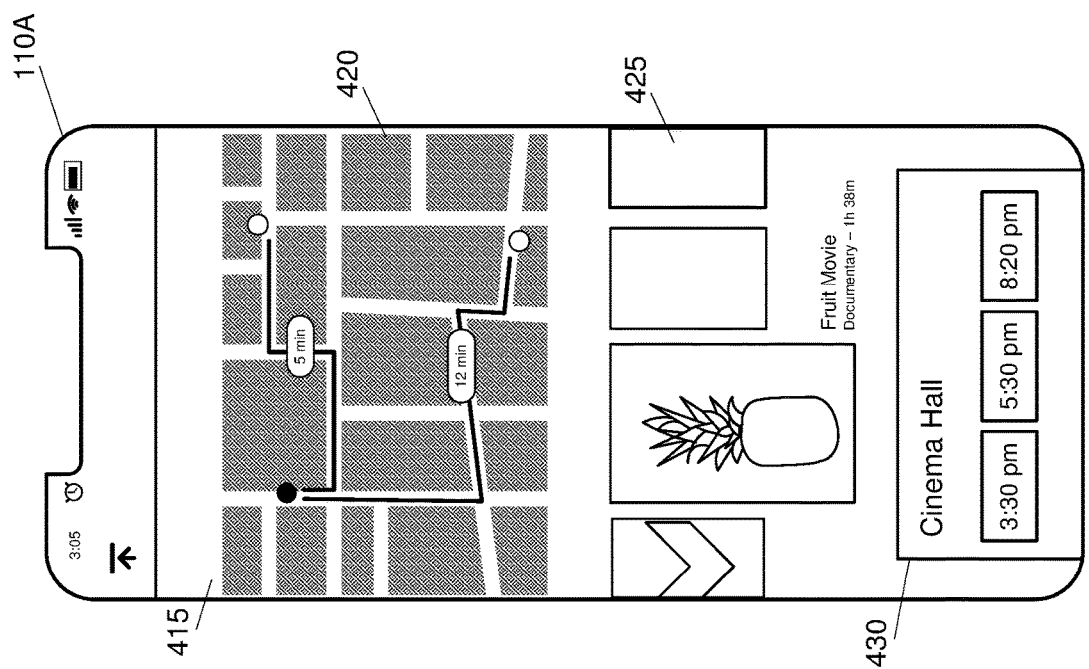
FIG. 4B illustrates a collaboration interface displayed on the client device of the first user, in accordance with an example embodiment.

FIG. 4B illustrates a collaboration interface displayed on the client device 110A of the first user, in accordance with an example embodiment. After opting in to the collaboration in response to the collaboration prompt presented by the collaboration system 130 in the messaging application 405, first user Wyatt is presented with a collaboration interface 415. The collaboration interface 415 is generated by the collaboration interface module 240 of the collaboration system 130 to include prompts for Wyatt to select values associated with attributes that are needed to execute the task of booking movie theater tickets, for example, attributes including a movie theater, a movie, and a showtime.

In the example of FIG. 4B, the collaboration interface 415 includes a map 420, a movie selection widget 425, and a showtime selection widget 430. In the example embodiment of FIG. 4B, the map 420 shows Wyatt estimated times it will take both himself and his collaborator (second user Jim Jones) to reach a suggested movie theater, Cinema Hall. The movie selection widget 425 displays movies that are showing at the theater. Wyatt can select one or more movies that he is interested in seeing via the movie selection widget 425, and attribute resolution module 230 may record his selections in a collaboration data object 300 that was generated to track the collaboration. Similarly, the showtime selection widget 430 displays options for showtimes of a selected movie. When Wyatt makes one or more showtime selections, the attribute resolution module 230 may record his selected values in the collaboration data object 300. In various embodiments, the attribute resolution module 230 may record and store, e.g., in the collaboration data store 220, multiple selected values at once, that is when attribute values are related to each other. For example, in some embodiments of the example shown in FIGS. 4A-4H, the attribute resolution module 230 may record a movie selection in the collaboration data object 300, which may be stored in the collaboration data store 220, only after the user has also selected a showtime for the movie that can also be recorded.

FIG. 4C further illustrates the collaboration interface displayed on the client device 110A of the first user, in accordance with an example embodiment. FIG. 4C includes example user Wyatt's client device 110A displaying the collaboration interface 415 including the map 420, the movie selection widget 425, and the showtime selection widget 430. In the example of FIG. 4C, Wyatt has made a showtime selection 435 indicating that he would be interested in watching "Fruit Movie" at a theater called Cinema Hall at 5:30 pm. The attribute resolution module 230 records the showtime selection 435 in the collaboration data object 300, which may be stored in the collaboration data store 220, associated with the collaboration between Wyatt and Jim. FIG. 4C also illustrates a time estimate display 440 which users may have the option to view, for example within a map 420 presented in the collaboration interface 415. The time estimate display 440 shows progress bars with wait times for each of the collaborating users until their planned meetup at the selected location and progress bars for the travel time of each of the collaborating users.

Figure 4E:
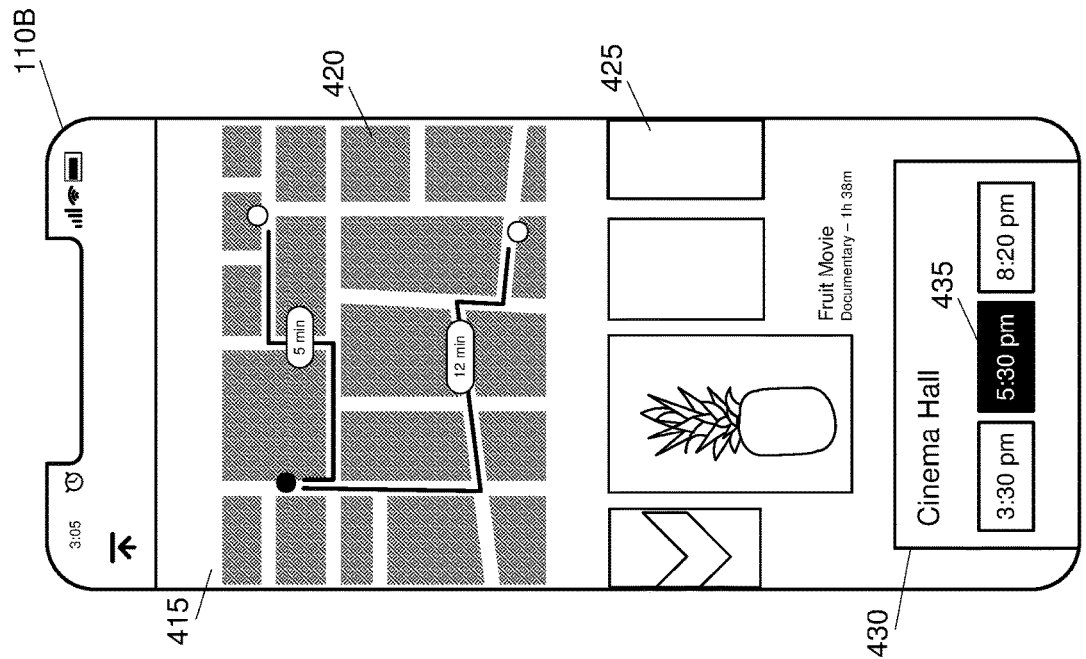
FIG. 4E further illustrates the collaboration interface displayed on the client device of the second user, in accordance with an example embodiment.
Figure 4D:
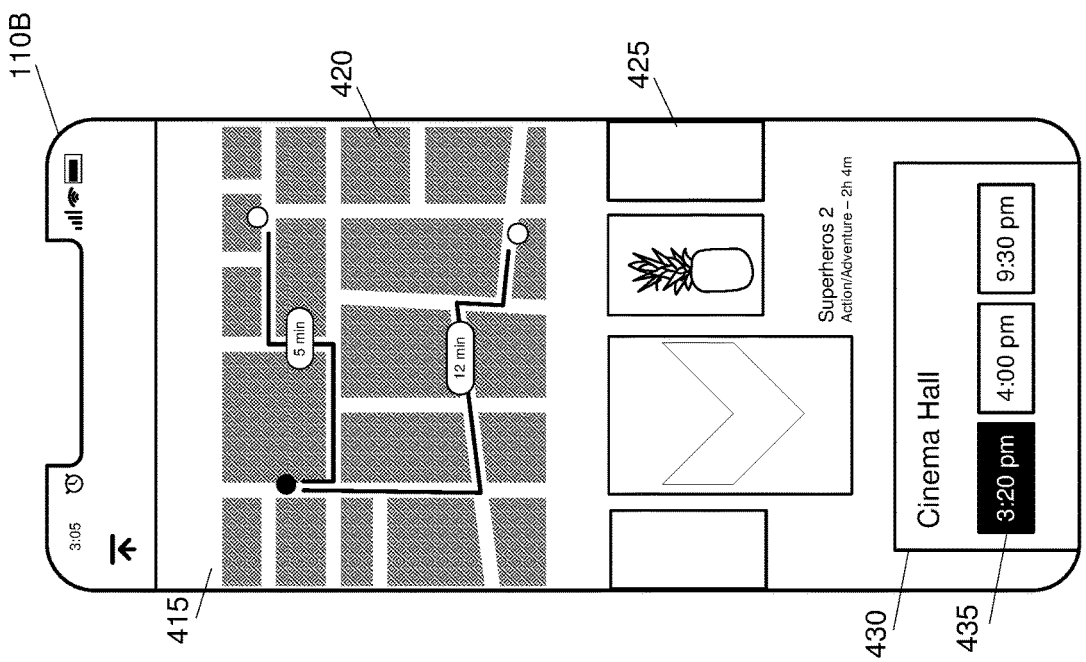
FIG. 4D illustrates a collaboration interface displayed on the client device of a second user, in accordance with an example embodiment.

FIG. 4D illustrates a collaboration interface displayed on the client device 110B of a second user, in accordance with an example embodiment. After opting in to the collaboration in response to a collaboration prompt presented by the collaboration system 130 in the messaging application 405, the second user Jim is also presented with a collaboration interface 415 including a map 420, a movie selection widget 425, and a showtime selection widget 435. In the example of FIG. 4D, Jim has selected the option to see a movie called "Superheros 2" at the theater Cinema Hall at 3:20 pm. This selection is recorded by the attribute resolution module 230 at the collaboration data object 300.

FIG. 4E further illustrates the collaboration interface displayed on the client device 110B of the second user, in accordance with an example embodiment. In the example of FIG. 4E, Jim has used the carousel feature of the example movie selection widget 425 to view options for seeing other movies and has made a second selection 435 in the showtime selection widget 430 indicating his interest in seeing "Fruit Movie" at Cinema Hall theater at 5:30 pm. This selection may be additionally recorded in the collaboration data object 300 by the attribute resolution module 230.

Figure 4G:
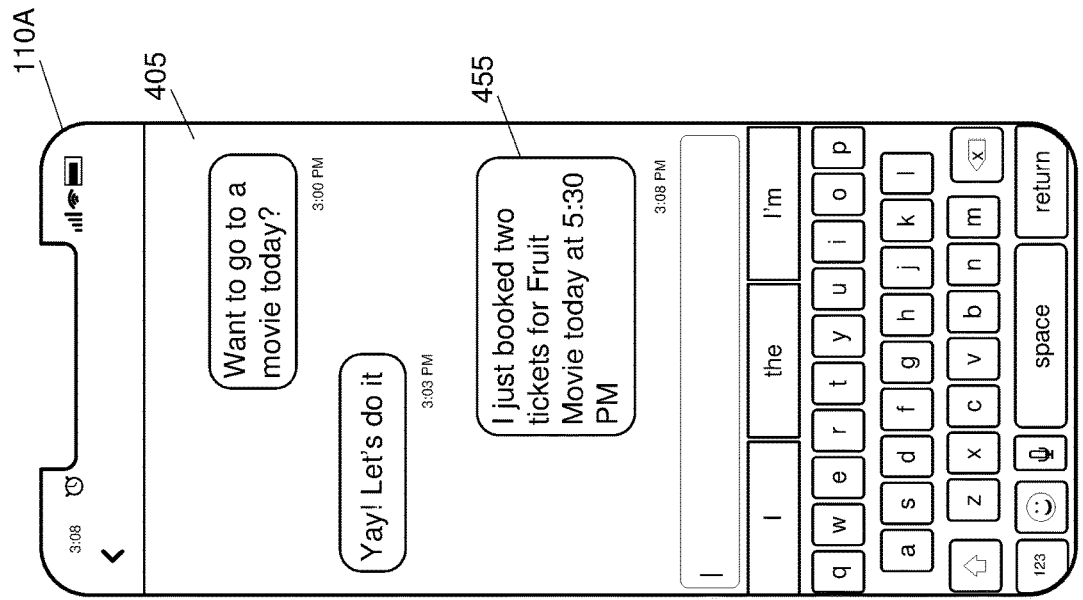
FIG. 4G illustrates a confirmation message displayed in the messaging application on the client device of the first user, in accordance with an example embodiment.
Figure 4F:
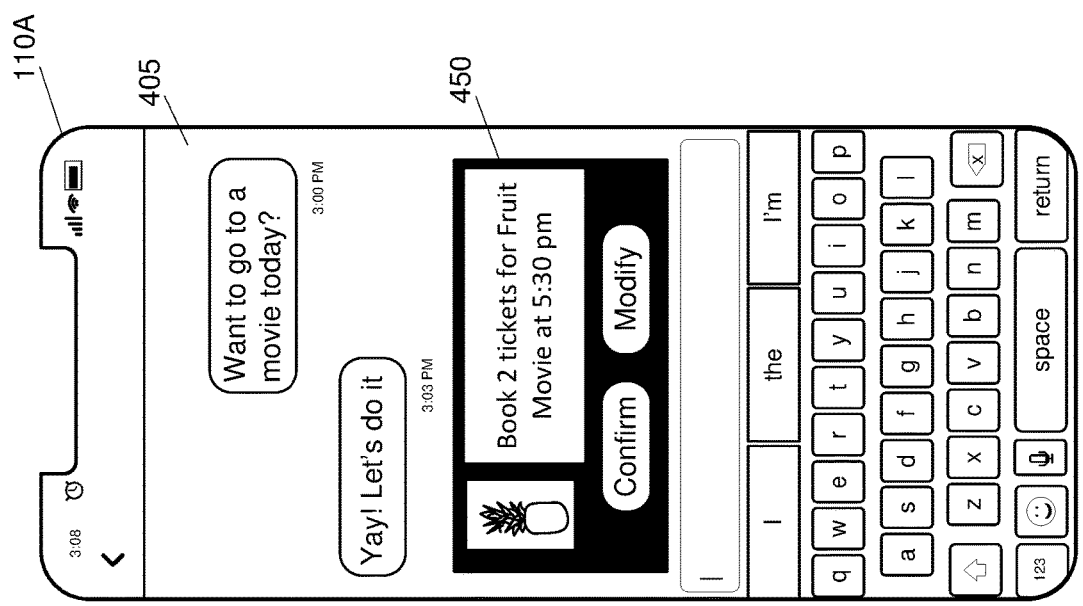
FIG. 4F illustrates a confirmation prompt displayed in the messaging application on the client device of the first user, in accordance with an example embodiment.

FIG. 4F illustrates a confirmation prompt displayed in the messaging application on the client device 110A of the first user, in accordance with an example embodiment. In the example of FIG. 4F, both collaborating users Wyatt and Jim have made selections for seeing "Fruit Movie" at Cinema Hall theater at 5:30 pm. In response to the matching selections recorded in the collaboration data object 300, the attribute resolution module 230 may lock the collaboration data object 300 so that neither Jim nor Wyatt can make further selections. In the example embodiment, the users may be returned to the messaging application 405 on the displays of their client devices 110. One or more of the users may be presented with a confirmation prompt 450 to confirm whether the intent execution module 250 should continue with executing the task of booking tickets. In the example of FIG. 4F, Wyatt receives a confirmation prompt 450 that gives him options to confirm or modify the booking determined by the collaboration system 130.

FIG. 4G illustrates a confirmation message displayed in the messaging application on the client device 110A of the first user, in accordance with an example embodiment. After confirming the booking, the intent execution module 250 may execute the tasks of booking tickets for Wyatt and Jim to see Fruit Movie at 5:30 pm at Cinema Hall. In the example embodiment intent execution module 250 executes an additional task of generating a confirmation message 455 to be displayed as a message from Wyatt to Jim in the messaging application 405.

Figure 4H:
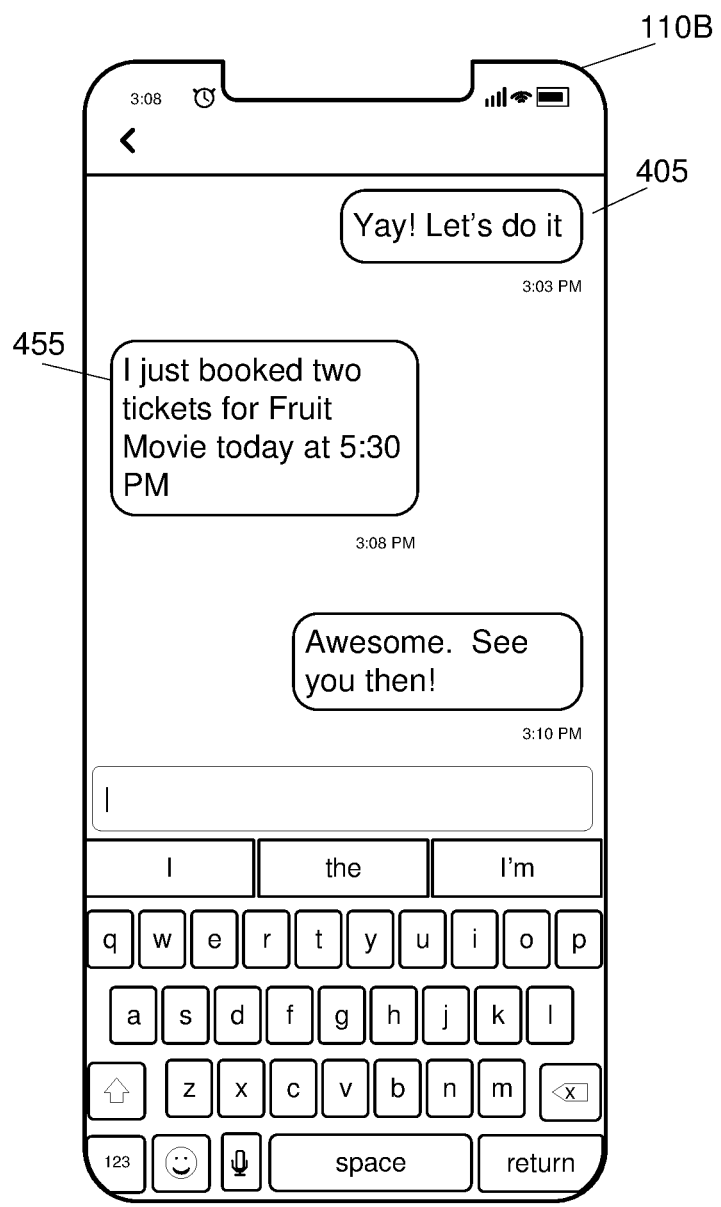
FIG. 4H illustrates the received confirmation message displayed on the client device of the second user, in accordance with an example embodiment.

FIG. 4H illustrates an example of the received confirmation message 455 displayed on the client device 110B of the second user, in accordance with an example embodiment. In some embodiments, the message received may be optional and/or provided through an alternate communication medium, e.g., an email or an app.

Figure 5:
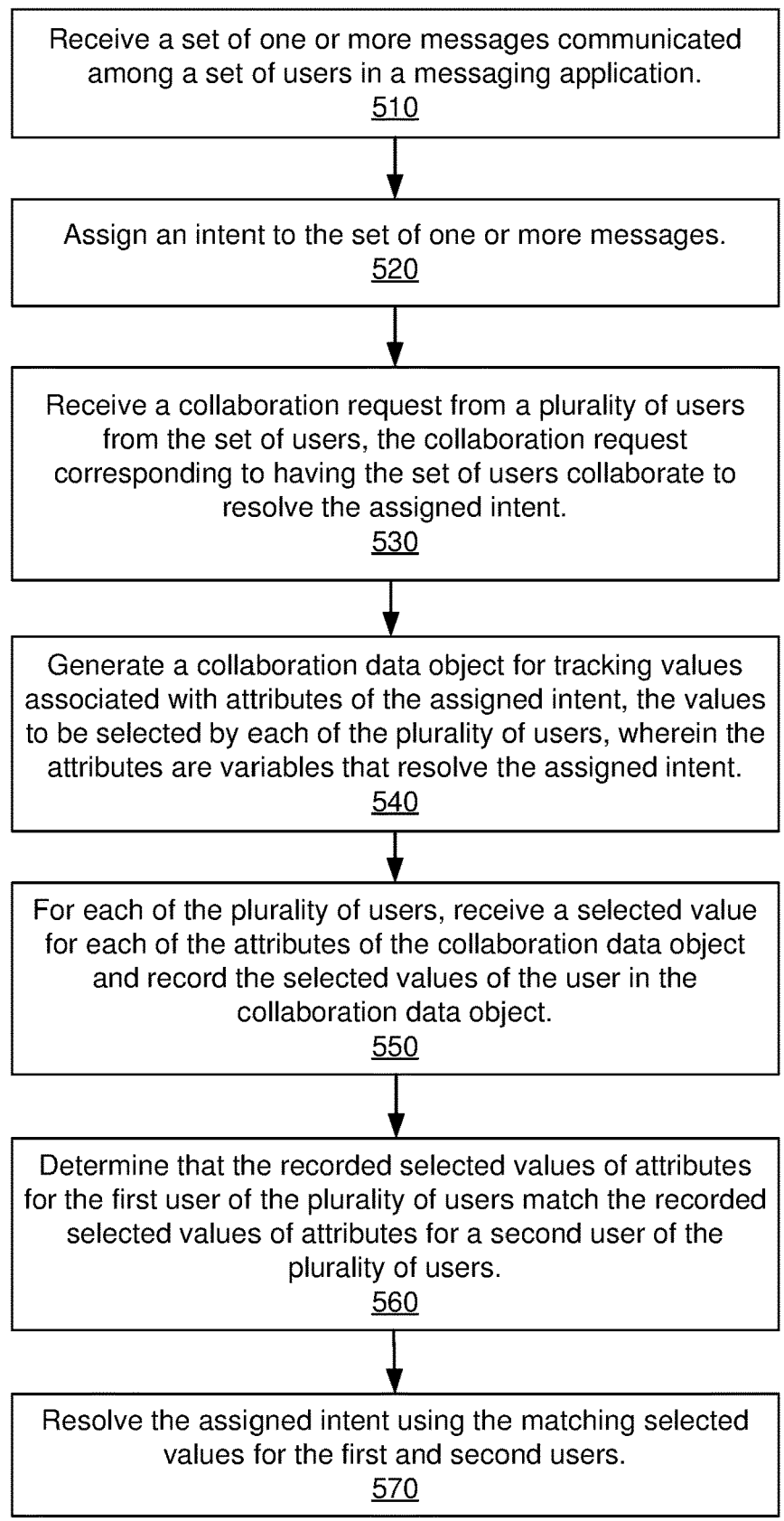
FIG. 5 is a flowchart illustrating a process of facilitating user collaboration, in accordance with an example embodiment.

FIG. 5 is a flowchart illustrating a process of facilitating user collaboration, in accordance with an example embodiment. The collaboration system 130 receives 510 a set of one or more messages communicated among a set of users in a messaging application and via the intent prediction module 210 assigns 520 an intent to the set of one or more messages. In some embodiments, the intent prediction module 210 may use a NLP system to monitor the messaging system and predict when a set of messages is indicative of an intent for the users. In other embodiments, users may proactively request a collaboration instance with a specified assigned intent, or a third party system may provide the collaboration system 130 with an intent prediction. In some embodiments, some or all of the collaborating users are provided with a prompt or link that the user can use to request to be included in the collaboration. In response, the collaboration system 130 receives 530 a collaboration request from each of a plurality of users from the set of users via the client devices 110. The received collaboration requests correspond to having the set of users collaborate to resolve the assigned intent.

The attribute resolution module 230 of the collaboration system 130 generates 540 a collaboration data object, e.g., one structured as collaboration data object 300, for tracking values associated with attributes of the assigned intent. The tracked values are values that have been selected by each of the plurality of users as values for attributes, which are variables that are used to execute the tasks that are associated with resolving the assigned intent.

For each of the plurality of users, the attribute resolution module 230 receives 550 one or more selected values for each of the attributes of the collaboration data object and records the selected values of the user in the collaboration data object. By monitoring the values in the collaboration data object, the attribute resolution module 230 determines 560 that the recorded selected values of attributes for a first user of the plurality of users match the recorded selected values of attributes for a second user of the plurality of users. In various embodiments, the attribute resolution module 230 may monitor the collaboration data object to determine whether two, a majority, all, or some other predetermined set of users have selected matching values for attributes before locking the collaboration data object or executing tasks using the selected values. The collaboration system 130, via the intent execution module 250, resolves 570 the assigned intent using the matching selected values for the first and second users.

Example Machine/Computing System

Figure 6:
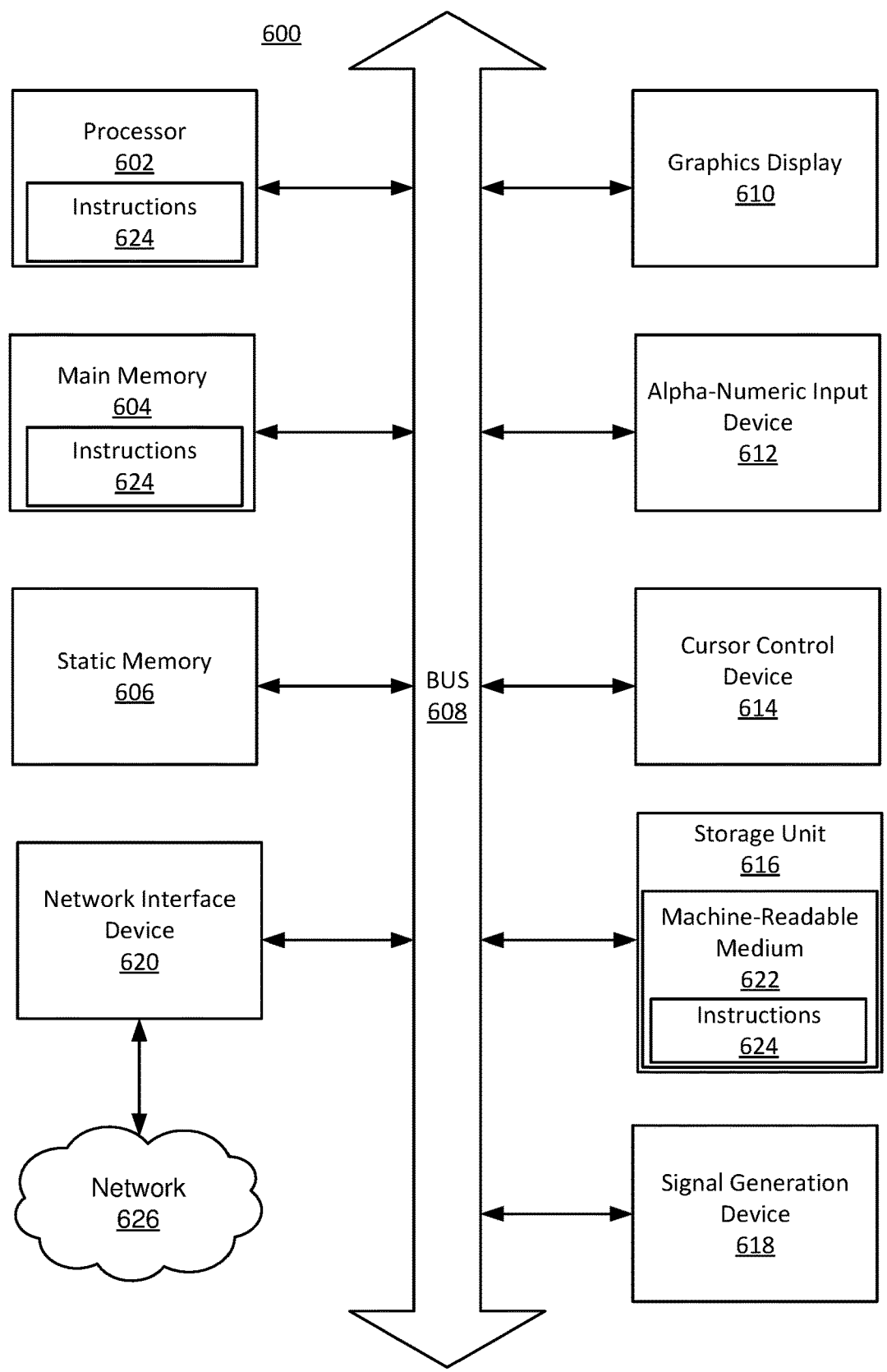
FIG. 6 is a block diagram illustrating components of an example machine able to read instructions from a machine-readable medium and execute them in one or more processors, in accordance with an embodiment.

FIG. 6 is a block diagram illustrating components of an example machine able to read instructions from a machine-readable medium and execute them in one or more processors (or controllers). Specifically, FIG. 6 shows a diagrammatic representation of the collaboration system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein, e.g., as described with FIGS. 2-5. Further, some of all of the components described with FIG. 6 may be applied in the client devices 110 and the collaboration system 130.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 606 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the intent prediction module 210, the attribute resolution module 230, the collaboration interface module 240, and/or the intent execution module 250. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626, such as the network 120, via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configurations beneficially provide a system for facilitating meaningful user collaboration so that a group of messaging users can come to a consensus on plans or ideas more quickly and efficiently (e.g., with fewer back and forth messages among members of the group saving time). Additionally, the system provides a beneficial method for determining when all members of a group of collaborating users have come to an agreement, making a determination possible at scale such that the individual users do not have to determine what many of the group members have expressed as preferences.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
receiving a set of one or more messages communicated among a plurality of users in a messaging application;
assigning an intent to the set of one or more messages;
generating a collaboration data object for tracking a value associated with an attribute of the assigned intent, the value to be selected by one or more of the plurality of users, wherein the attribute is a variable associated with the assigned intent;
receiving a selected value for the attribute of the collaboration data object, and
recording the selected values in the collaboration data object;
determining that the recorded selected value of the attribute for a first user of the plurality of users match the recorded selected value of the attribute for a second user of the plurality of users;
responsive to determining that the recorded selected value of the attribute for the first user of the plurality of users match the recorded selected value of the attribute for the second user, locking the matching recorded selected value of the attribute for the first and second users such that no users can further change selected value of the attribute, wherein locking the matching recorded selected value does not lock values of other attributes of the assigned intent; and
resolving the assigned intent using the matching recorded selected value of the attribute for the first and second users.

2. The computer-implemented method of claim 1, wherein generating a collaboration data object comprises generating a JavaScript Object Notation (JSON) document including JSON objects for attributes associated with the assigned intent.

3. The computer-implemented method of claim 1, further comprising sending a shareable key associated with the assigned intent to each of the plurality of users, wherein selection of the shareable key by a user generates a collaboration request indicating that the user would like to collaborate with other users from the the plurality of users to resolve the assigned intent.

4. The computer-implemented method of claim 1, wherein determining that the recorded selected values of attributes for the first user of the plurality of users match the recorded selected values of attributes for the second user further comprises determining that the recorded selected values of attributes for the first user of the plurality of users match the recorded selected values of attributes for each of the plurality of users.

5. The computer-implemented method of claim 1, wherein the assigned intent is a task that can be executed by an application on a user device, and wherein resolving the assigned intent comprises obtaining a set of attribute values that are needed by the user device to execute the task.

6. The computer-implemented method of claim 5, further comprising executing the task, wherein executing the task comprises displaying an option for a user to initiate the task within the messaging application.

7. The computer-implemented method of claim 1, further comprising providing to a user device of each of the plurality of users, a collaboration interface that presents options for values the user may select for each of the attributes of the collaboration object.

8. A non-transitory computer-readable storage medium comprising stored instructions that when executed by one or more processors of one or more computing devices, the instructions causing the one or more computing devices to:
receive a set of one or more messages communicated among a plurality of users in a messaging application;
assign an intent to the set of one or more messages;
generate a collaboration data object for tracking a value associated with an attribute of the assigned intent, the value to be selected by one or more of the plurality of users, wherein the attribute is a variable associated with the assigned intent;
receive a selected value for the attribute of the collaboration data object, and
record the selected values in the collaboration data object;
determine that the recorded selected value of the attribute for a first user of the plurality of users match the recorded selected value of the attribute for a second user of the plurality of users;
lock the matching recorded selected value of the attribute for the first and second users such that no users can further change selected value of the attribute when determined that the recorded selected value of the attribute for the first user of the plurality of users match the recorded selected value of the attribute for the second user, wherein locking the matching recorded selected value does not lock values of other attributes of the assigned intent; and
resolve the assigned intent using the matching recorded selected value of the attribute for the first and second users.

9. The non-transitory computer-readable storage medium of claim 8, wherein the instructions to generate a collaboration data object further comprise instructions to generate a JavaScript Object Notation (JSON) document including JSON objects for attributes associated with the assigned intent.

10. The non-transitory computer-readable storage medium of claim 8, further comprising stored instructions that when executed cause the one or more computing devices to:
transmit a shareable key associated with the assigned intent to each of the plurality of users; and
generate, when the shareable key is selected, a collaboration request indicating that the user would like to collaborate with other users from the the plurality of users to resolve the assigned intent.

11. The non-transitory computer-readable storage medium of claim 8, wherein the instructions to determine that the recorded selected values of attributes for the first user of the plurality of users match the recorded selected values of attributes for the second user further comprises instructions to determine that the recorded selected values of attributes for the first user of the plurality of users match the recorded selected values of attributes for each of the plurality of users.

12. The non-transitory computer-readable storage medium of claim 8, wherein the assigned intent is a task that can be executed by an application on a user device, and wherein the instructions to resolve the assigned intent comprises obtaining a set of attribute values that are needed by the user device to execute the task.

13. The non-transitory computer-readable storage medium of claim 12, further comprising stored instructions that when executed cause the one or more computing devices to: execute the task, wherein the instructions to execute the task further comprises instructions to provide for display an option for a user to initiate the task within the messaging application.

14. The non-transitory computer-readable storage medium of claim 8, further comprising stored instructions that when executed cause the one or more computing devices to: provide to a user device of each of the plurality of users, a collaboration interface that presents options for values the user may select for each of the attributes of the collaboration object.

15. A system comprising:
one or more computer processors; and
one or more computer-readable mediums storing instructions that, when executed by the one or more computer processors, cause the system to:
receive a set of one or more messages communicated among a plurality of users in a messaging application;
assign an intent to the set of one or more messages;
generate a collaboration data object for tracking a value associated with an attribute of the assigned intent, the value to be selected by one or more of the plurality of users, wherein the attribute is a variable associated with the assigned intent;
receive a selected value for the attribute of the collaboration data object, and
record the selected values in the collaboration data object;
determine that the recorded selected value of the attribute for a first user of the plurality of users match the recorded selected value of the attribute for a second user of the plurality of users;
lock the matching recorded selected value of the attribute for the first and second users such that no users can further change selected value of the attribute when determined that the recorded selected value of the attribute for the first user of the plurality of users match the recorded selected value of the attribute for the second user, wherein locking the matching recorded selected value does not lock values of other attributes of the assigned intent; and resolve the assigned intent using the matching recorded selected value of the attribute for the first and second users.

16. The system of claim 15, wherein the instructions to generate a collaboration data object further comprise instructions to generate a JavaScript Object Notation (JSON) document including JSON objects for attributes associated with the assigned intent.

17. The system of claim 15, further comprising instructions that when executed by the one or more processors, cause the system to:

transmit a shareable key associated with the assigned intent to each of the plurality of users; and generate, when the shareable key is selected, a collaboration request indicating that the user would like to collaborate with other users from the the plurality of users to resolve the assigned intent.

18. The system of claim 15, wherein the instructions to determine that the recorded selected values of attributes for the first user of the plurality of users match the recorded selected values of attributes for the second user further comprise instructions to determine that the recorded selected values of attributes for the first user of the plurality of users match the recorded selected values of attributes for each of the plurality of users.

19. The system of claim 15, wherein the assigned intent is a task that can be executed by an application on a user device, and wherein the instructions to resolve the assigned intent comprise obtaining a set of attribute values that are needed by the user device to execute the task.

20. The system of claim 15, further comprising stored instructions that when executed by the one or more processors, cause the system to: provide to a user device of each of the plurality of users, a collaboration interface that presents options for values the user may select for each of the attributes of the collaboration object.

* * * * *

UNITED STATES PATENT AND TRADEMARK OFFICE
CERTIFICATE OF CORRECTION

| | | |
|---|---|---|
| PATENT NO. | : 12,182,383 B2 | Page 1 of 1 |
| APPLICATION NO. | : 18/306141 | |
| DATED | : December 31, 2024 | |
| INVENTOR(S) | : Sheng Yue | |

It is certified that error appears in the above-identified patent and that said Letters Patent is hereby corrected as shown below:

On the Title Page

Item (57), in Column 2, under "ABSTRACT", Line 10, delete "have selection" and insert -- have selected --, therefor.

Item (57), in Column 2, under "ABSTRACT", Lines 11-12, delete "the collaboration the collaboration" and insert -- the collaboration --, therefor.

In the Claims

In Column 15, in Claim 3, Line 10, delete "the the" and insert -- the --, therefor.

In Column 16, in Claim 10, Line 12, delete "the the" and insert -- the --, therefor.

In Column 18, in Claim 17, Line 1, delete "the the" and insert -- the --, therefor.

Signed and Sealed this
Eleventh Day of March, 2025

Coke Morgan Stewart
*Acting Director of the United States Patent and Trademark Office*